Dec. 8, 1931.  F. W. HARNEY  1,835,043

HOPPER FOR PLASTIC MATERIAL

Filed March 25, 1930  2 Sheets-Sheet 1

INVENTOR
Francis W. Harney
BY Edward H. Crumpton
his ATTORNEY

Dec. 8, 1931.  F. W. HARNEY  1,835,043
HOPPER FOR PLASTIC MATERIAL
Filed March 25, 1930  2 Sheets-Sheet 2
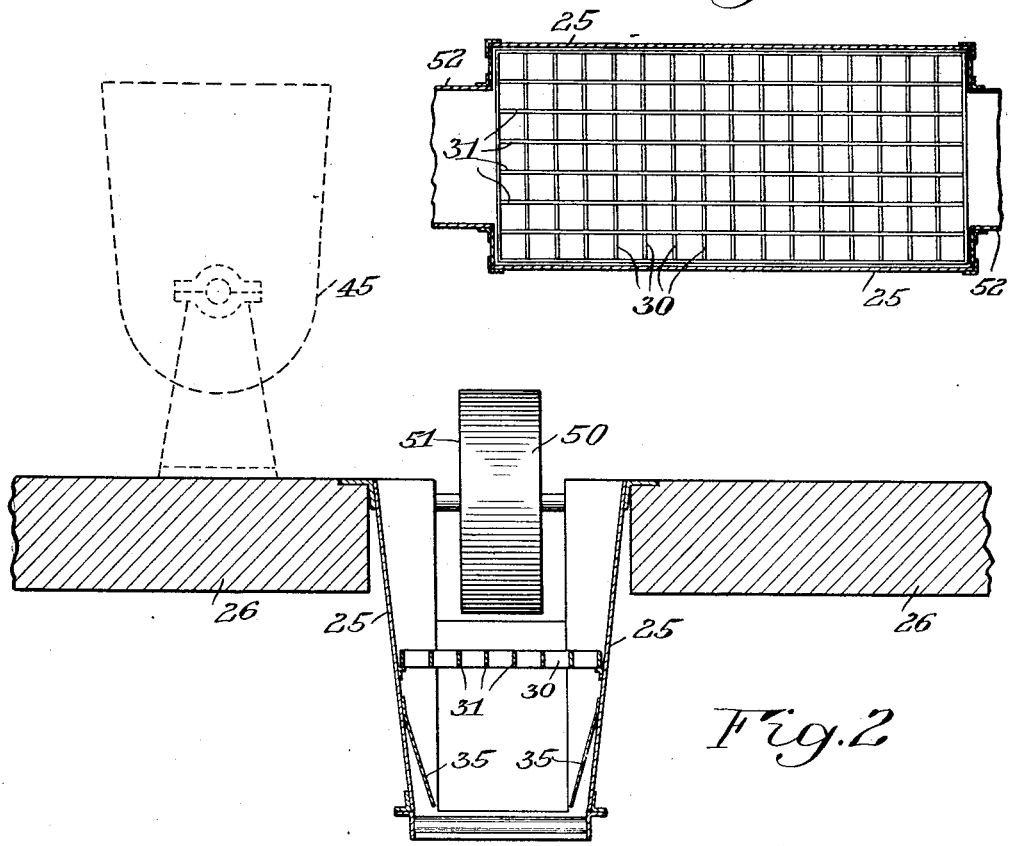
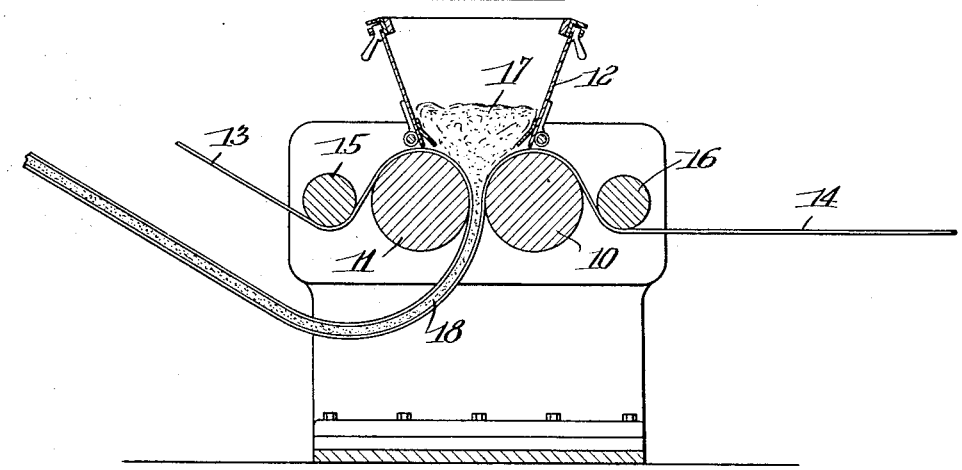
INVENTOR
Francis W. Harney
BY Edward H. Crumpton
his ATTORNEY Patented Dec. 8, 1931

1,835,043

UNITED STATES PATENT OFFICE

FRANCIS W. HARNEY, OF LOCKPORT, NEW YORK, ASSIGNOR TO THE UPSON COMPANY, OF LOCKPORT, NEW YORK, A CORPORATION OF NEW YORK

HOPPER FOR PLASTIC MATERIAL

Application filed March 25, 1930. Serial No. 438,884.

This invention relates to a hopper for plastic material and has for its object the provision of a generally improved and more satisfactory hopper provided with means for receiving the impact of relatively heavy masses of material dumped into the hopper, so that such masses will not break or damage parts of the apparatus.

Another object of the invention is the provision of means within the hopper for automatically distributing plastic material dumped at one point in the hopper.

A further object is the provision of hopper means particularly suitable for use with apparatus for forming wallboard or the like from plastic material.

To these and other ends the invention resides in certain improvements and combinations of parts, all as will be hereinafter more fully described, the novel features being pointed out in the claims at the end of the specification.

In the drawings:

Fig. 2 is a vertical section taken transversely across the apparatus substantially on the line 2—2 of Fig. 1;

Fig. 3 is a plan of a portion of the hopper, and

Similar reference numerals throughout the several views indicate the same parts.

The invention is here illustrated in connection with apparatus for forming wallboard or the like from plastic material, but it is to be understood that many features of the invention are applicable equally well to other forms of apparatus for forming plastic material into various other articles.

Figure 1:
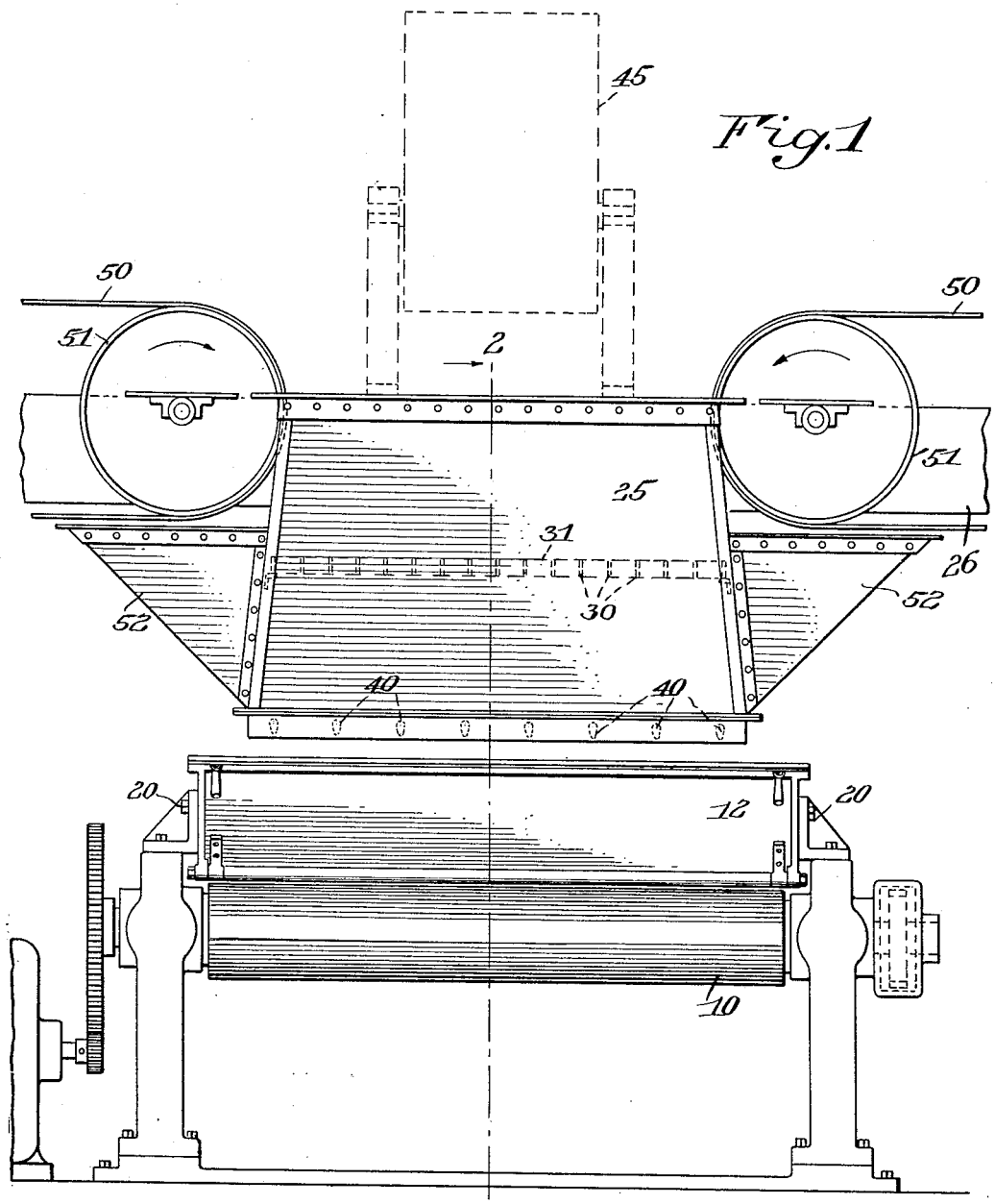
Fig. 1 is a front elevation of apparatus constructed in accordance with a preferred embodiment of the invention.

As shown in Figs. 1 and 2, the apparatus comprises forming means such as the rolls 10 and 11 spaced from each other, and a hopper 12 immediately above the rolls for containing plastic material and delivering such material to the rolls. When wallboard is to be made, for example, the liners or facing sheets 13 and 14 of paper or the like are passed under guide rolls 15 and 16 and over the forming rolls 10 and 11 in the manner clearly illustrated in Fig. 2. The plastic material 17 within the hopper 12 feeds into the space between the liners 13 and 14 as the rolls rotate and the assembled article comprising the two liners and a layer of plastic material between them issues from between the rolls as at 18 and is further treated in any usual or appropriate manner.

The plastic material may comprise, for example, a mixture of sodium silicate and a mineral filler such as ground limestone. Such a mixture is of plastic or dough-like consistency while it is in the hopper 12 and while it is being placed between the liners 13 and 14. After the assembled wallboard 18 issues from the rolls, however, it may be subjected to heat treatments which serve to intumesce or puff the plastic material and to harden it, in order to make the finished wallboard.

The rolls 10 and 11 are preferably mounted for relative adjustment toward and away from each other so that different thicknesses of wallboard may be made, and the hopper 12 is mounted for vertical movement relative to the rolls so that it can be adjusted in accordance with the variable spacing of the rolls and so that it may be slightly elevated whenever a splice on the liners 13 and 14 must pass between the rolls and the hopper. This adjustment, for instance, may be accomplished as by loosening the nuts 20 to permit the hopper to be raised or lowered.

Plastic material is preferably mixed in relatively large batches in mixing machines somewhat similar to concrete mixers or dough mixers. If a relatively large quantity of plastic material such as has been mixed in one of these machines is dumped directly into the hopper 12, it is found that the impact of the material is very apt to break the liner sheets 13 and 14 or to injure other parts of the apparatus, which is in some respects delicate and sensitive so that it may be capable of fine adjustment. In order to prevent such breakage or damage, the present invention provides means for receiving the impact of large quantities of plastic material and for retarding the downward movement of the material so that it does not produce any great strain upon the liners 13 and 14 or other delicate parts of the mechanism.

Preferably there is provided a second hopper 25 directly above the hopper 12, which second hopper is mounted entirely independently of the hopper 12 such as by being suspended from a working floor 26. The hopper 25 forms practically an upward continuation of the hopper 12 and in some respects the two hoppers may be considered as one. It is advantageous to have the portion 25 mounted independently of the portion 12, however, in order to reduce the weight and size of the parts to be moved when the portion 12 is adjusted. Furthermore, as will be described below, the means for receiving the impact and retarding the downward movement of masses of plastic material is mounted in the upper hopper portions 25, and thus the stresses upon these means are transmitted entirely through the hopper 25 to the floor 26 and do not affect the adjustable hopper 12.

Within the hopper 25, and extending transversely thereacross, there are placed one or more grates which serve to take the impact of and impede the downward movement of plastic material dumped into the hopper. One of these grates, as shown particularly in Figs. 2 and 3, is composed of spaced transverse members 30 and spaced longitudinal members 31, all of which may be formed integrally with each other if desired. This grate is suitably supported in the hopper 25 as by resting upon angle irons fixed to the inner wall of the hopper.

Figure 4:
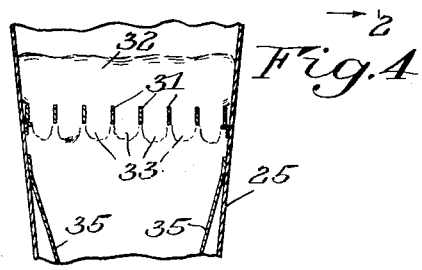
Fig. 4 is a vertical section through a fragment of the hopper illustrating the action of the grate on plastic material in the hopper.

When plastic material, and particularly large and heavy masses thereof, is dumped into the hopper 25, it hits upon the grate 30, 31 which momentarily stops the downward movement of the material and causes it to accumulate on top of the grate as at 32 in Fig. 4. The plastic material then commences oozing or dropping through the spaces in the grate as indicated at 33 in Fig. 4. The grate thus breaks up the material into relatively small masses which drop from the bottom of the grate relatively slowly so that they do not cause any great impact in the hopper 12 or on the liners 13 and 14, and do not damage these parts. As the material drops from the bottom of the grate, the portions thereof near the sides of the hopper are deflected inwardly by the angular or oblique deflecting members 35, so that they fall an ample distance inside of the edges of the hopper 12.

In addition to breaking up the masses of plastic material into relatively small masses which drop relatively slowly, the grate has still another function in that it serves to distribute the plastic material substantially evenly or uniformly throughout the length of the hopper even though the material is dumped at the center or any other one point of the hopper. The rolls 10 and 11 and the hopper are relatively long, and if some means were not provided for distributing material over the entire length, plastic material which was dumped at one point would have to be distributed by hand so that the entire length of the rolls would be adequately supplied with the plastic material. It is found in practice, however, that when a large mass of plastic material is dumped at one point upon the grate, the grate so slows up the downward movement that the material tends to spread out fairly uniformly over the entire area of the hopper just as plastic material tends to settle down and spread out when placed upon a solid flat surface. Thus the grate constitutes an automatic and highly satisfactory means for distributing the material and makes it unnecessary to distribute the material by hand or to take any great care in dumping the material in any particular position in the hopper.

In many instances it is desired to place a second grate within the hopper, vertically spaced from the first grate. Such a second grate is illustrated in Figs. 1 and 2 and comprises the bars 40 extending transversely across the hopper, these bars being of somewhat ovoid cross section so that they will not clog readily and may be cleaned easily. This lower grate further breaks up the pieces of plastic material which pass through and fall from the upper grate, and impedes their downward progress so that they fall more gently into the hopper 12.

A mixer for mixing the plastic material is indicated diagrammatically in dotted outline at 45. It is mounted on trunnions on the floor 26 so that after the mixing of the material is completed, the mixer may be turned to dump directly into the top of the hopper 25. Preferably a battery of two or more mixers is used, three being most satisfactory. Ordinarily only one mixer can be placed in position to dump directly into the hopper, and conveying means is accordingly necessary to bring the material from the other mixers to the hopper. Such conveying means is shown in Fig. 1, and comprises the conveyor belts 50 running over pulleys 51 adjacent the ends of the hopper. The hopper is provided with wing-like extensions 52 underlying the pulleys 51 so that any plastic material which does not fall off the belts 50 immediately into the main portion of the hopper but which may become detached from the belts as they pass further around the pulleys, will be caught by these extensions 52 and directed into the hopper. One mixer similar to the mixer 45 is preferably placed to the right of the hopper in position to dump upon one of the conveying belts 50, while another similar mixer is placed to the left of the hopper to dump upon the other conveying belt 50.

In operation, two of the mixers will ordinarily be mixing the plastic material while the third mixer is in the act of dumping. The plastic material is dumped either directly from the mixer 45 into the top of the hopper 25 or is conveyed by the conveyors 50 from one of the other mixers to the hopper. In either case, the result is that the plastic material falls onto the top of the grate 30, 31. This grate retards the downward movement of the material and causes it to spread out fairly evenly over the entire area of the hopper even though it is dumped substantially at one point. The plastic material on the grate is indicated at 32 in Fig. 4, and it oozes through the grate as at 33 and drops from the bottom of the grate relatively slowly in relatively small particles or lumps. These particles may be further retarded and broken up by the lower grate 40, and they then fall into the lower hopper 12 and accumulate to some extent therein as indicated at 17. The impact of these relatively small particles is so slight, however, that they do not damage the hopper 12 nor break the liner sheets 13 and 14.

Because the impact of heavy masses of plastic material does not come directly against the hopper 12, this hopper may be made of relatively light construction so that it may be adjusted easily and accurately. The plastic material will be distributed fairly evenly throughout the length of the hopper 12 because of the effect of the grate in distributing the material in the upper hopper portion 25, and thus the entire length of the rolls 10 and 11 will be properly supplied with material.

While one embodiment of the invention has been disclosed it is to be understood that the inventive idea may be carried out in a number of ways. This application is therefore not to be limited to the precise details described, but is intended to cover all variations and modifications thereof falling within the spirit of the invention or the scope of the appended claims.

I claim as my invention:

1. In apparatus for forming plastic material, the combination with forming means, of hopper means having a receiving opening for receiving relatively heavy masses of plastic material and a delivery opening for delivering plastic material to said forming means, and retarding means in said hopper between said receiving opening and said delivery opening, said retarding means serving to receive and support said heavy masses of plastic material and to cause said masses to be distributed substantially evenly and delivered relatively slowly to said forming means.

2. In apparatus for forming plastic material, the combination with forming means, of hopper means having a receiving opening in which relatively heavy masses of plastic material may be dumped and a delivery opening for delivering plastic material to said forming means, and a plurality of spaced supporting members extending transversely across said hopper means for receiving the impact of heavy masses of plastic material dumped thereon and causing said plastic material to be delivered relatively slowly to said forming means through the spaces between said members.

3. In apparatus for forming plastic material, the combination with forming means, of hopper means having a receiving opening in which relatively heavy masses of plastic material may be dumped and a delivery opening for delivering plastic material to said forming means, and a grate extending across said hopper means for receiving the impact of heavy masses of plastic material dumped thereon and causing said plastic material to be delivered to said forming means relatively slowly through said grate.

4. In apparatus for forming plastic material, the combination with forming means, of hopper means having a receiving opening in which relatively heavy masses of plastic material may be dumped and a delivery opening for delivering plastic material to said forming means, and a plurality of vertically spaced grates each extending substantially horizontally across said hopper means for impeding downward movement of heavy masses of plastic material dumped in said hopper means and for causing such material to be delivered relatively slowly to said forming means.

5. In apparatus for forming wallboard from plastic material, the combination with a pair of forming rolls, of a relatively long hopper for delivering plastic material to said rolls, and a grate within said hopper for distributing substantially uniformly along said hopper masses of plastic material dumped on said grate.

6. In apparatus for forming wallboard from plastic material, the combination with a pair of forming rolls, of a hopper mounted immediately adjacent said rolls for supplying plastic material thereto, and a second hopper mounted above said first named hopper for receiving a supply of plastic material and delivering it to said first named hopper.

7. In apparatus for forming wallboard from plastic material, the combination with a pair of forming rolls, of a hopper mounted immediately adjacent said rolls for supplying plastic material thereto, a second hopper mounted above said first named hopper independently thereof, and a grate in said second hopper for impeding downward movement of masses of plastic material dumped in said second hopper and for causing such plastic material to be delivered to said first named hopper relatively slowly through said grate.

8. In apparaus for forming plastic material, the combination with a hopper, of a grate within said hopper for impeding downward movement of masses of plastic material dumped into the hopper, and an inclined deflecting member within said hopper beneath said grate for deflecting plastic material passing through said grate.

FRANCIS W. HARNEY.